(12) United States Patent
Tarasov et al.

(10) Patent No.: US 10,969,988 B2
(45) Date of Patent: Apr. 6, 2021

(54) PERFORMING PROACTIVE COPY-ON-WRITE FOR CONTAINERS

(71) Applicant: International Business Machines Corporation, Armonk, NY (US)

(72) Inventors: Vasily Tarasov, Port Jefferson Station, NY (US); Lukas Rupprecht, San Jose, CA (US); Dimitrios Skourtis, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/434,446

(22) Filed: Jun. 7, 2019

(65) Prior Publication Data

US 2020/0387306 A1 Dec. 10, 2020

(51) Int. Cl.
*G06F 3/06* (2006.01)

(52) U.S. Cl.
CPC ............ *G06F 3/065* (2013.01); *G06F 3/0604* (2013.01); *G06F 3/0632* (2013.01); *G06F 3/0665* (2013.01); *G06F 3/0673* (2013.01)

(58) Field of Classification Search
CPC ...... G06F 3/065; G06F 3/0665; G06F 3/0673; G06F 3/0604; G06F 3/0632
See application file for complete search history.

(56) References Cited

U.S. PATENT DOCUMENTS

| | | | |
|---|---|---|---|
| 9,304,946 B2 | 4/2016 | Solihin | |
| 9,916,207 B2 | 3/2018 | Oberhofer et al. | |
| 10,127,234 B1* | 11/2018 | Krishnan | G06F 16/1847 |
| 10,659,533 B1* | 5/2020 | Zhao | H04L 67/2847 |
| 2013/0086579 A1 | 4/2013 | Venkat et al. | |
| 2015/0309745 A1* | 10/2015 | Wilkinson | G06F 3/0683 |
| | | | 711/162 |
| 2016/0232197 A1 | 8/2016 | Vaquero Gonzalez | |
| 2018/0039524 A1* | 2/2018 | Dettori | G06F 9/505 |
| 2018/0300197 A1 | 10/2018 | Marron | |

FOREIGN PATENT DOCUMENTS

| | | |
|---|---|---|
| CN | 107729020 A | 2/2018 |
| WO | 2017166205 A1 | 10/2017 |

OTHER PUBLICATIONS

Nitin Agarwal's "Docker container's filesystem Demystified;" Jan. 22, 2017; available at: https://medium.com/©BeNitinAgarwal/docker-containers-filesystenn-demystified-b6ed8112a04a (Year: 2017).*

(Continued)

*Primary Examiner* — Prasith Thammavong
*Assistant Examiner* — Richard L Sutton
(74) *Attorney, Agent, or Firm* — Zilka-Kotab, P.C.

(57) ABSTRACT

A computer-implemented method according to one embodiment includes monitoring and storing historical data access to image data by a container within a container environment, identifying or predicting that a container is to be started utilizing the image within the container environment, predicting data to be accessed by the container, based on the historical data access by the image, and initiating a copy-on-write (COW) for the data to be accessed by the container, in response to identifying or predicting that the container is to be started.

19 Claims, 6 Drawing Sheets

(56) References Cited

OTHER PUBLICATIONS

Eddy Mavungu's "Docker Storage: An Introduction;" Nov. 14, 2016; available at: https://rollout.io/blog/docker-storage-introduction/ (Year: 2016).*

Luigi's "Using Docker to Generate Machine Learning Predictions in Real Time;" Apr. 4, 2019; available at: https://mlinproduction.com/docker-for-ml-part-4/ (Year: 2019).*

Docker Docs'; "Docker Overview;" Apr. 9, 2020; available at: https://web.archive.org/web/20200409104109/https://docs.docker.com/get-started/overview/ (Year: 2020).*

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Dec. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

\* cited by examiner

PERFORMING PROACTIVE COPY-ON-WRITE FOR CONTAINERS

BACKGROUND

The present invention relates to container environments implementations, and more specifically, this invention relates to proactively performing copy-on-write in response to detecting the starting of a container or predicting the future start of a container.

Container environments are increasing in popularity, as they enable the encapsulation of application code and all dependencies for that code, so that applications may be run quickly and reliably in a variety of different execution environments. Within a container environment, containers are created from images, and a root file system of the container is sourced from an image. File system creation for a container takes significant time and processing/storage resources, and current methods to address this result in issues such as high write latency and I/O interference.

SUMMARY

A computer-implemented method according to one embodiment includes monitoring and storing historical data access to image data by a container within a container environment, identifying or predicting that a container is to be started utilizing the image within the container environment, predicting data to be accessed by the container, based on the historical data access by the image, and initiating a copy-on-write (COW) for the data to be accessed by the container, in response to identifying or predicting that the container is to be started.

According to another embodiment, a computer program product for performing proactive copy-on-write for containers includes a computer readable storage medium having program instructions embodied therewith, where the computer readable storage medium is not a transitory signal per se, and where the program instructions are executable by a processor to cause the processor to perform a method including monitoring and storing, by the processor, historical data access to image data by a container within a container environment, identifying or predicting, by the processor, that a container is to be started utilizing the image within the container environment, predicting, by the processor, data to be accessed by the container, based on the historical data access by the image, and initiating, by the processor, a copy-on-write (COW) for the data to be accessed by the container, in response to identifying or predicting that the container is to be started.

According to another embodiment, a system includes a processor, and logic integrated with the processor, executable by the processor, or integrated with and executable by the processor, where the logic is configured to monitor and store historical data access to image data by a container within a container environment, identify or predict that a container is to be started utilizing the image within the container environment, predict data to be accessed by the container, based on the historical data access by the image, and initiate a copy-on-write (COW) for the data to be accessed by the container, in response to identifying or predicting that the container is to be started.

Other aspects and embodiments of the present invention will become apparent from the following detailed description, which, when taken in conjunction with the drawings, illustrate by way of example the principles of the invention.

DETAILED DESCRIPTION

Figure 1:
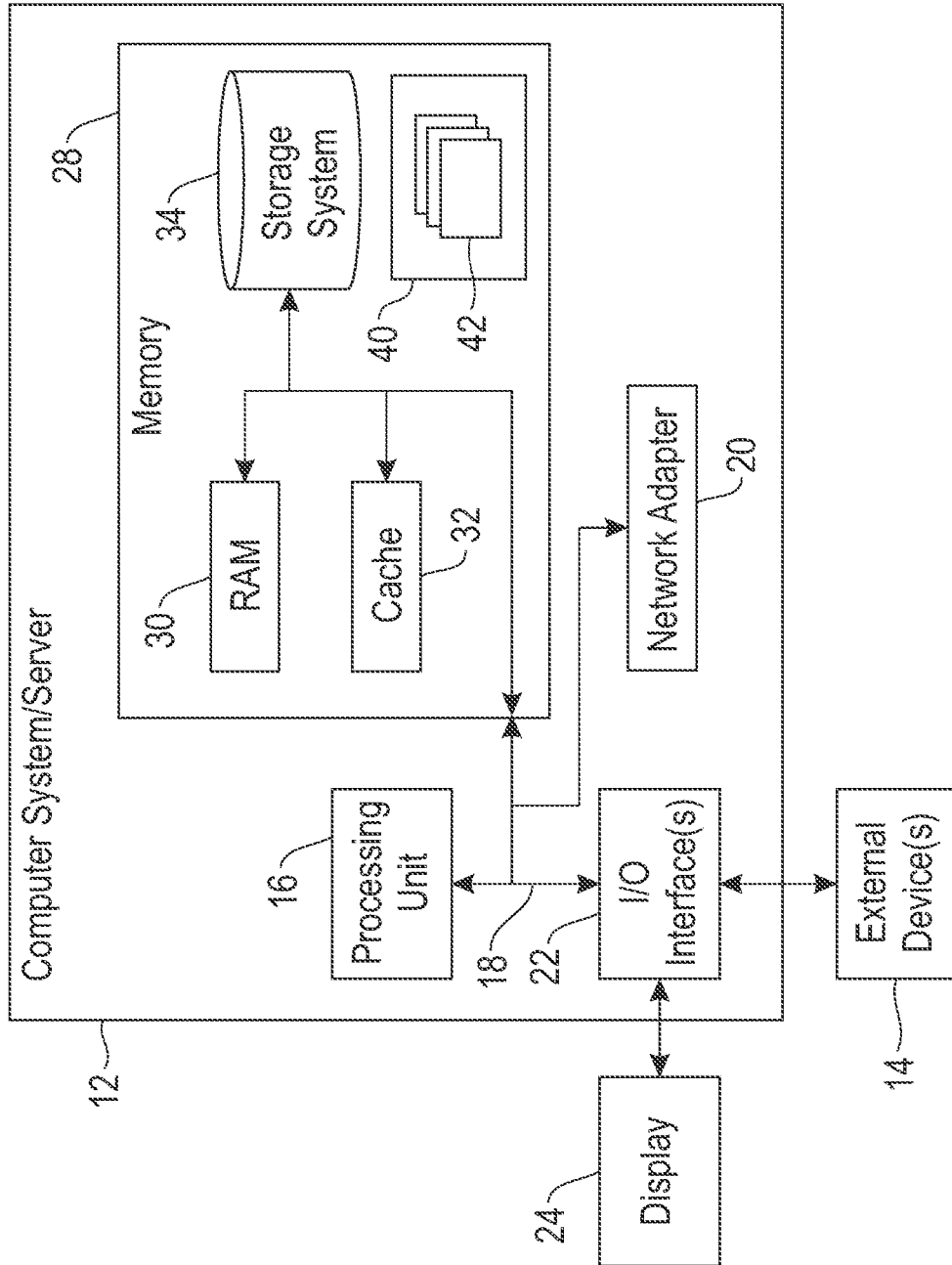
FIG. 1 depicts a cloud computing node according to an embodiment of the present invention.

The following description discloses several preferred embodiments of systems, methods and computer program products for performing proactive copy-on-write for containers. Various embodiments provide a method for predicting data to be accessed by a container based on historical data access, and proactively initiating a copy-on-write (COW) for the predicted data in response to an indication that the container is to be started.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performing proactive copy-on-write for containers.

In one general embodiment, a computer-implemented method includes monitoring and storing historical data access to image data by a container within a container environment, identifying or predicting that a container is to be started utilizing the image within the container environment, predicting data to be accessed by the container, based on the historical data access by the image, and initiating a copy-on-write (COW) for the data to be accessed by the container, in response to identifying or predicting that the container is to be started.

In another general embodiment, a computer program product for performing proactive copy-on-write for containers includes a computer readable storage medium having program instructions embodied therewith, where the computer readable storage medium is not a transitory signal per se, and where the program instructions are executable by a processor to cause the processor to perform a method including monitoring and storing, by the processor, historical data access to image data by a container within a container environment, identifying or predicting, by the processor, that a container is to be started utilizing the image within the container environment, predicting, by the processor, data to be accessed by the container, based on the historical data access by the image, and initiating, by the processor, a copy-on-write (COW) for the data to be accessed by the container, in response to identifying or predicting that the container is to be started.

In another general embodiment, a system includes a processor, and logic integrated with the processor, executable by the processor, or integrated with and executable by the processor, where the logic is configured to monitor and store historical data access to image data by a container within a container environment, identify or predict that a container is to be started utilizing the image within the container environment, predict data to be accessed by the container, based on the historical data access by the image, and initiate a copy-on-write (COW) for the data to be accessed by the container, in response to identifying or predicting that the container is to be started.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
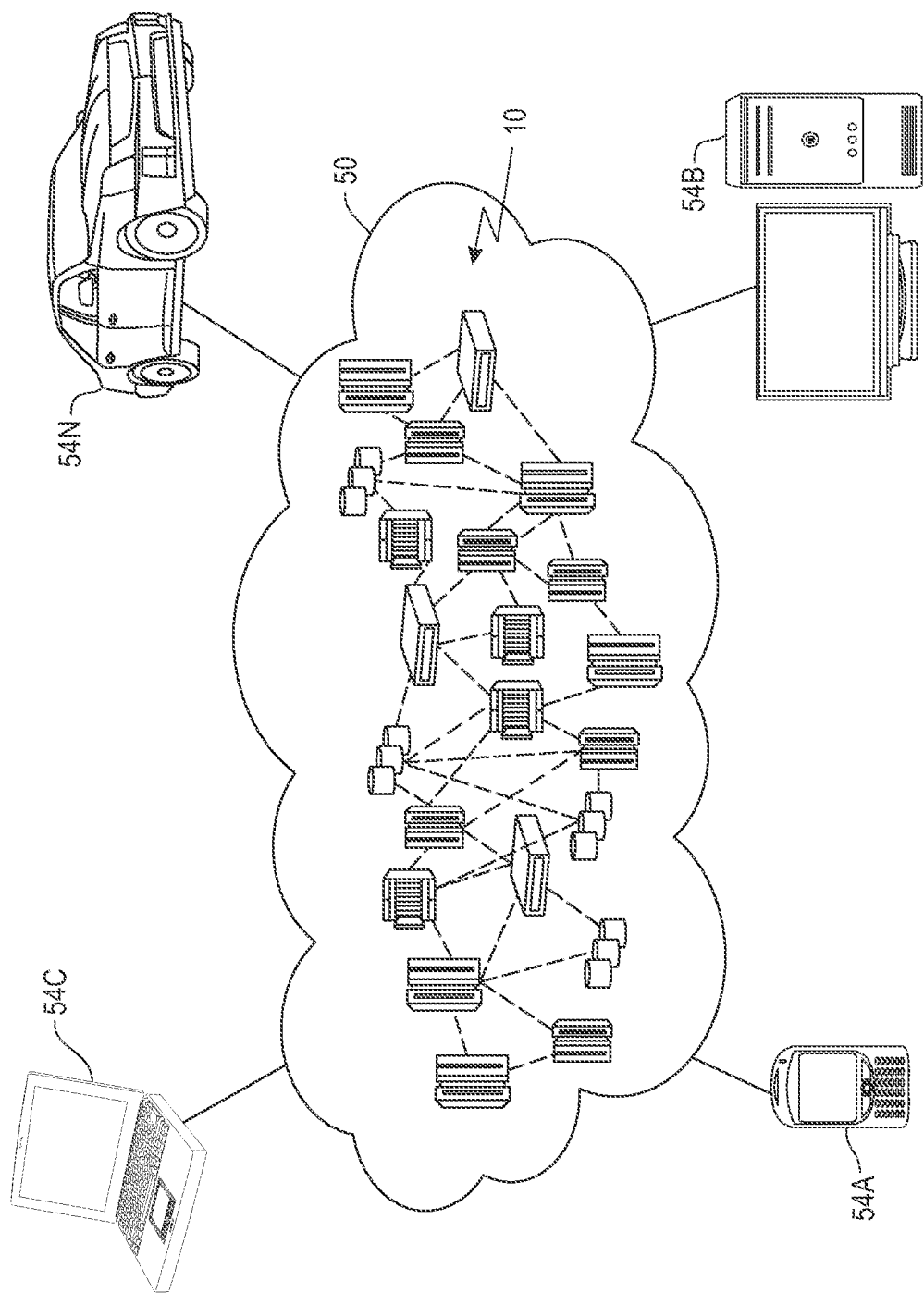
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
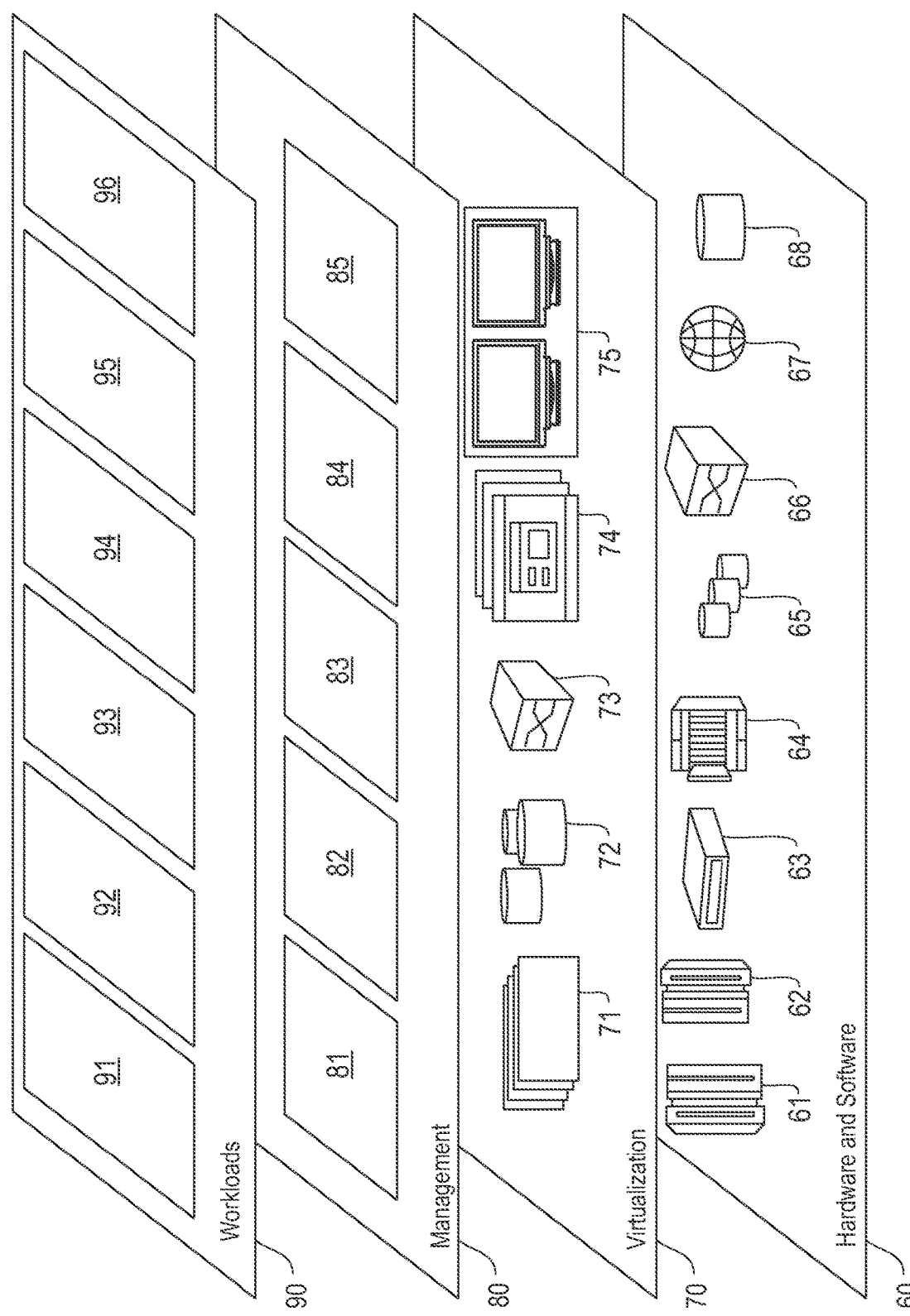
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container environment implementation 96.

Figure 4:
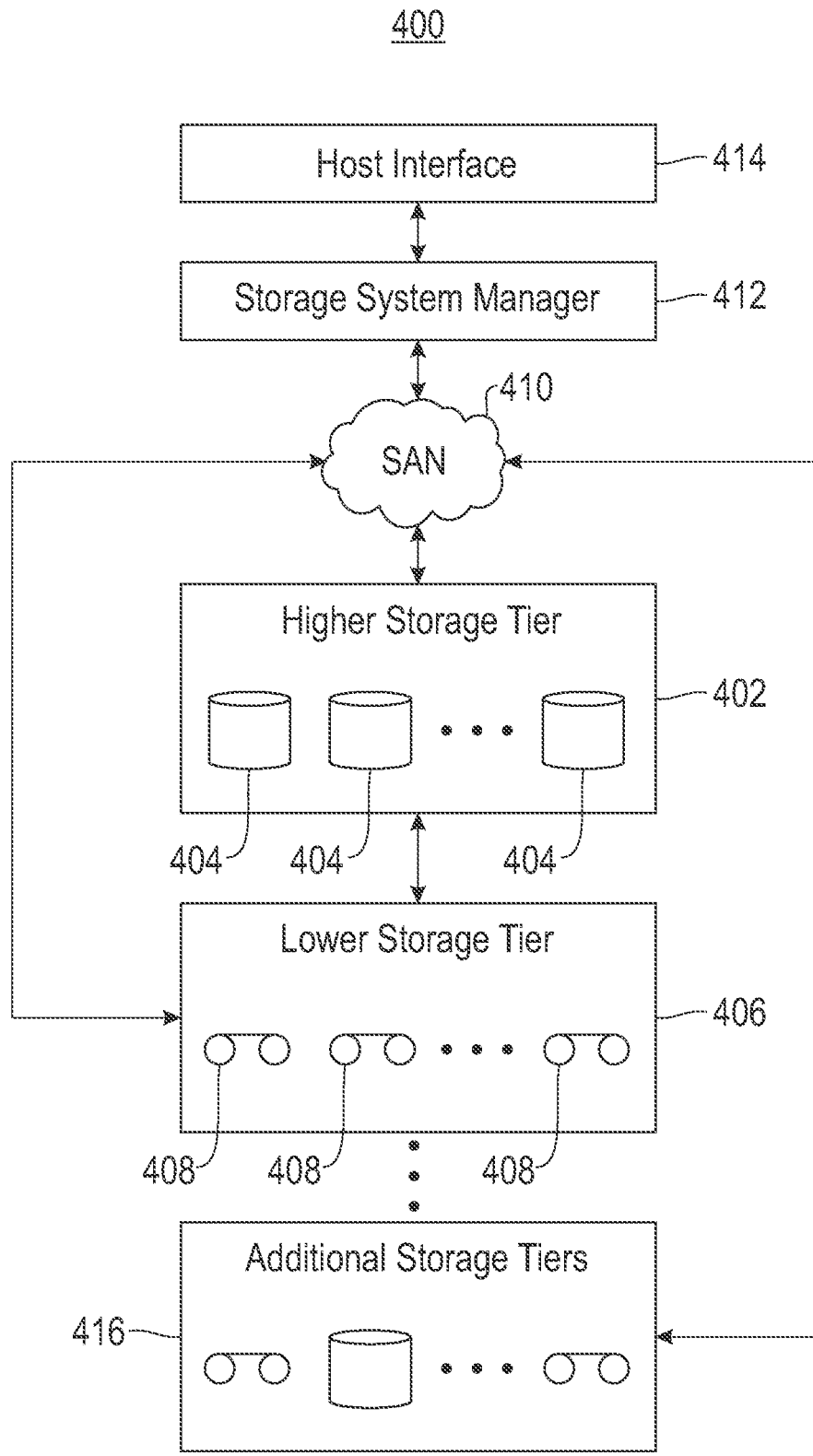
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
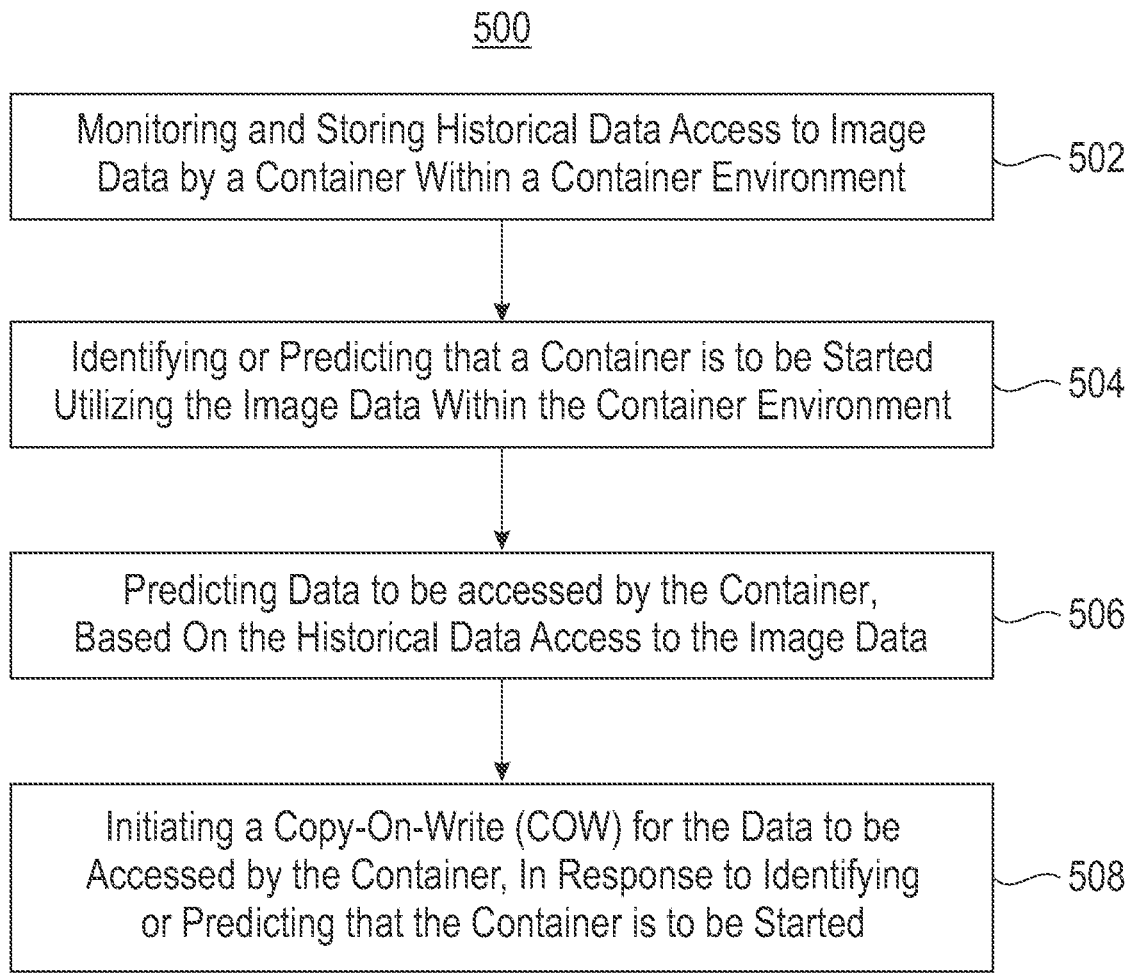
FIG. 5 illustrates a flowchart of a method for performing proactive copy-on-write for containers, in accordance with one embodiment.

Now referring to FIG. 5, a flowchart of a method 500 is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where historical data access to image data by a container within a container environment is monitored and stored. In one embodiment, the image data may include and image that includes multiple layers of files used to execute code in a container within the container environment. In another embodiment, the image data may be built from instructions for a complete and executable version of an application.

Additionally, in one embodiment, one or more containers may be initiated within the container environment utilizing the image data. For example, a root file system of the container may be based on the image data. In another embodiment, the image data may include a standalone executable package of software that includes everything needed to run an application (e.g., code, a runtime, system tools, system libraries and settings, etc.).

Further, in one embodiment, a container may include a unit of software that includes code and all its dependencies. In another embodiment, the historical data access may include data input and output (I/O) to and from the image data. For example, the historical data access may include I/O to and from the image data after a container is started within the container environment utilizing the image data. In another example, the historical data access may include an accessing of one or more files in the image data. In yet another example, the historical data access may include a time during a runtime of the container at which one or more files in the image data are accessed by the container.

Further still, in one embodiment, the historical data access may be monitored by a workload monitor within the container environment. In another embodiment, the historical data access may be stored in a container image registry (e.g., Docker Hub), within or outside of the container environment. In yet another embodiment, the historical data access may be stored in association with an identifier of the image data. In this way, a per-image history of access to data by the containers may be created and stored.

Also, in one embodiment, the container environment may include all hardware and software necessary to initiate and run a plurality of containers. In another embodiment, the container environment may include one or more of a container orchestrator, a container runtime environment, a management layer, etc.

In addition, method 500 may proceed with operation 504, where it is identified or predicted that a container is to be started utilizing the image data within the container environment. In one embodiment, the identification may be performed in response to monitoring one or more actions within the container environment.

For example, the container runtime may start containers utilizing image data. In another example, an indication that the container is to be started utilizing the image data may be sent from the container runtime to a controller within the container environment. In yet another example, the fact the container was pulled from the image registry may serve as an indicator of a future container start.

Furthermore, method 500 may proceed with operation 506, where data to be accessed by the container is predicted, based on the historical data access to the image data. In one embodiment, the historical data access may be retrieved within the container environment, and may be used to predict data to be accessed by the container. In another embodiment, the predicting may be performed prior to the identification of the start of the container utilizing the image data.

Further still, in one embodiment, a time of the accessing of the data by the container may also be predicted. For example, a time within the runtime of the container when the data is predicted to be accessed may also be predicted. In another embodiment, the data to be accessed may be predicted by projecting future data access for the container, based on the historical data access by the previously running containers. For example, if historical data access by many containers indicates that a file is accessed in the image data at a predetermined time during a runtime of a container utilizing the image data, it may be predicted that the same file will be accessed by the container at the approximately same predetermined time during a runtime of a current container.

Also, in one embodiment, one or more patterns may be identified within the historical data access, and the data to be accessed by the container may be predicted based on the one or more patterns. In another embodiment, the data to be accessed may be predicted at one or more levels of granularity. For example, the data to be accessed may include one or more files, one or more portions of files (e.g., one or more specific blocks, etc.).

Additionally, method 500 may proceed with operation 508, where a copy-on-write (COW) is initiated for the data to be accessed by the container, in response to identifying or predicting that the container is to be started. In one embodiment, the COW may be initiated by sending an instruction to perform a COW for the data to a storage driver (e.g., Aufs, Overlays, Dm-snap) within the container environment. In another embodiment, the COW may be performed for the data to be accessed by the container prior to the starting of the container within the container environment.

Further, in one embodiment, the COW may be performed for the data to be accessed by the container at one or more predetermined times during the runtime of the container. These one or more predetermined times may be predicted based on historical times of historical data access during historical container runtimes utilizing the image data within the container environment.

Further still, in one embodiment, the COW may be initiated for the data to be accessed by the container in response to identifying a pulling of the container within the container environment. For example, images may be stored within a centralized repository. In another example, before a container is started based on an image within the repository, a pull command may be issued to bring the image into local memory. This pull command may be intercepted and used to identify that the container is to be started utilizing the image data within the container environment.

Also, in one embodiment, a root file system prior to the initiated COW may be maintained within the container environment. In another embodiment, the data to be accessed by the container may include the entire image. For example, a COW may be initiated for the entire image unless a higher level of granularity is specified.

In addition, in one embodiment, the data to be accessed by the container may be identified based on a manifest. For example, the associated image may be described by its manifest. In another example, the manifest may be extended to include information regarding what objects in the image will be written when a container is started from the image. In yet another example, these objects may include an entire file or one or more portions of a file (e.g., a set of specific blocks, etc.).

Furthermore, in one embodiment, feedback may be identified in response to initiating the COW for the data to be accessed by the container. For example, monitoring may be performed in order to determine whether the data for which the proactive COW is performed is used during a runtime of the container within the container environment. In another example, if it determined that the data is not being used, then COW may be disabled for that data and/or for the container.

Further still, in one embodiment, the historical data access may be stored within a registry within the container environment. For example, the historical data access may then be accessed by one or more daemons within the container environment.

In this way, a COW may be initiated only for data likely to be accessed by a container (instead of all data associated with a container, or no data at all). This may improve an I/O usage by the container, which may increase a performance of the container within the container environment, as well as a performance of the container environment itself. Additionally, writes within the container environment may have an improved I/O workload, and the container environment itself will be more stable. Further, COW commands may be more evenly balanced within nodes, which may enable more containers to be run per node, which in turn may increase a density of the node, thereby increasing a performance of the node.

Figure 6:
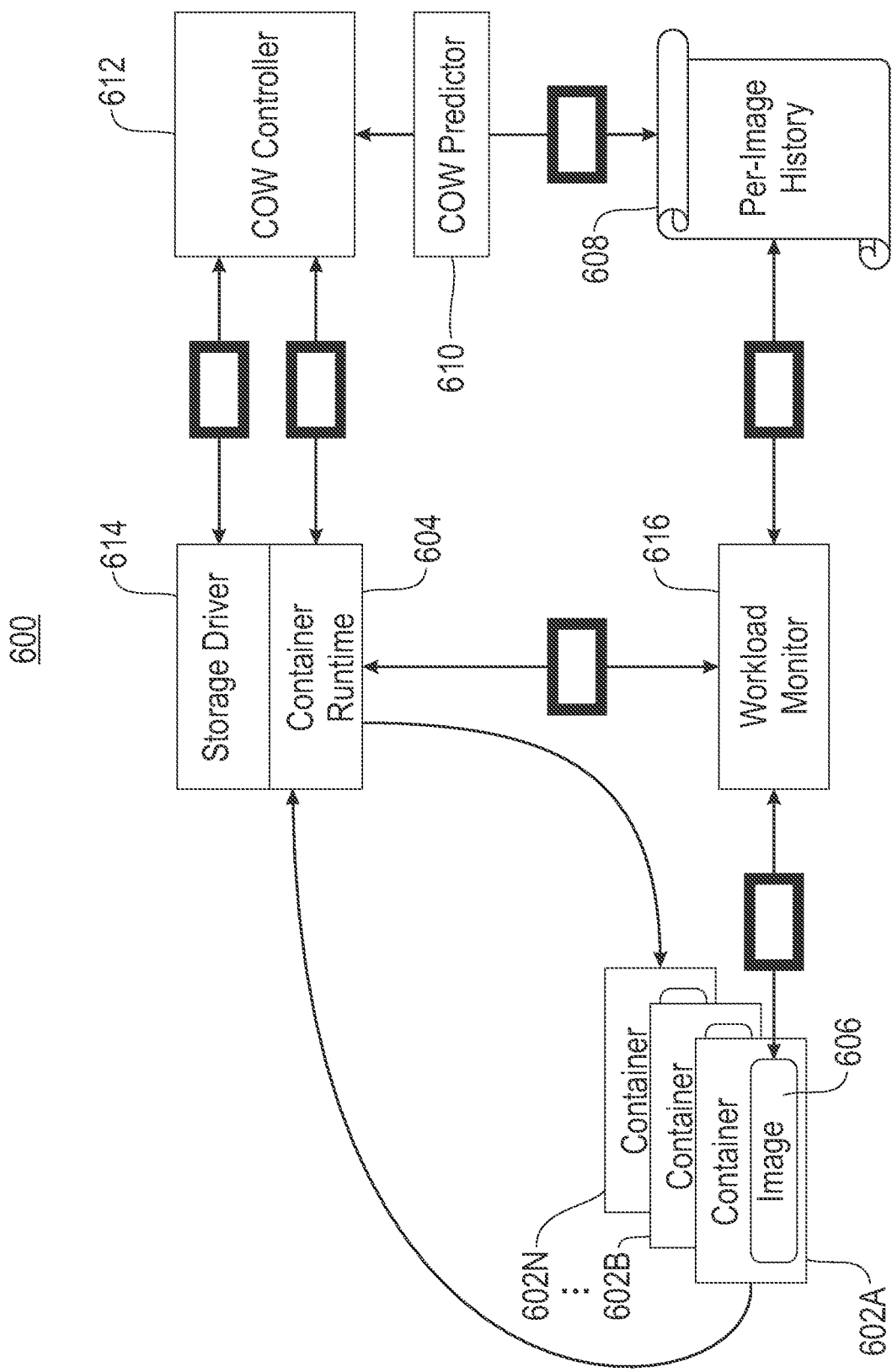
FIG. 6 illustrates an exemplary proactive copy-on-write environment, in accordance with one embodiment.

FIG. 6 illustrates an exemplary proactive copy-on-write (COW) environment 600, according to one exemplary embodiment. As shown, a workload monitor 616 detects the start of a container 602A by a container runtime 604. In response to detecting the start of the container 602A, the workload monitor 616 monitors data input/output (I/O) to the associated image 606 for the container 602A. This monitored data I/O is then saved as historical data in association with the image by the workload monitor 616 within a per-image history repository 608.

Additionally, a COW predictor 610 accesses the historical monitored I/O data for the associated image 606 from the per-image history repository 608, and predicts data to be accessed by the associated image 606 when a future container is started. A COW controller 612 monitors the container runtime 604 and identifies a start of a container 602B (or a pulling of the container 602B) that utilizes the associated image 606. In response, the COW controller 612 retrieves the data to be accessed by the associated image 606 from the COW predictor 610, and triggers a COW for such data at a storage driver 614.

Proactive Copy-on-Write for Container Runtimes

During a runtime of a container runtime, responsibilities include creating namespaces, setting up Cgroups, creating a container's root file system, and starting the containerized process. The container's root filesystem comes from an image (e.g., a collection of files initially located in a tarball (a group or archive of files that are bundled together using the tar command)). This image may be layered in some embodiments.

For fast filesystem creation, COW is used. However, application write performance is poor because of COW. For example, an initial write latency causes interference to other I/O, and a high density of containers exacerbates this issue.

In view of the facts that container images are reused (e.g., started) many times, and highly repetitive workloads are often implemented for images, data updates in an image may be predicted, and COW may be performed proactively based on the prediction.

In one embodiment, COW may be triggered in response to one or more events. For example, COW may be triggered in response to one or more of identifying a pulling/building of an image and identifying a creation and/or starting of a container. In another example, COW may be triggered at one or more predetermined times during a container runtime. In yet another example, a pool of pre-COW'd root file systems may be maintained, and this pool may be configurable by a user.

In another embodiment, a whole image may be COW'd in response to the one or more events. In another embodiment, an image maintainer may specify to-be-written objects in an image manifest. In yet another embodiment, a user may define to-be-written files per-container or per-image.

Additionally, in one embodiment, a container client may maintain accesses for running images. For example, containers may be started from the same images many times. An initial COW covering a predetermined amount of data (from nothing to everything) may be performed on unknown images.

Further, in one embodiment, COW may be disabled for a container or image if too many false positives are identified. This may be performed utilizing a feedback loop. In another embodiment, statistics may be propagated to a central shared registry (e.g. a Docker hub, etc.). In yet another embodiment, COW may be performed according to a predetermined level of granularity. For example, COW may be performed on entire files, predetermined portions of files, etc.

In one embodiment, a proactive copy-on-write (COW) may be performed for container images. In another embodiment, portions of images that are updated by a container may be predicted. In yet another embodiment, a time to trigger the COW may be identified based on historical data or predetermined data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
monitoring and storing within a registry of a container environment historical data access to image data by a container within the container environment;
predicting that a container is to be started utilizing the image data within the container environment;
prior to predicting that the container is to be started utilizing the image data within the container environment, predicting data to be accessed by the container as well as a plurality of predetermined times of an accessing of the image data by the container, based on the historical data access to the image data;
initiating a copy-on-write (COW) for the data to be accessed by the container, in response to predicting that the container is to be started, where the COW is performed for the data to be accessed by the container at the plurality of predetermined times during a runtime of the container; and
disabling the COW for the data to be accessed by the container in response to determining that the data is not used during a runtime of the container within the container environment.

2. The computer-implemented method of claim 1, wherein the historical data access includes data input and output (I/O) to and from the image data.

3. The computer-implemented method of claim 1, wherein the historical data access includes a time during a runtime of the container at which one or more files are accessed in the image data.

4. The computer-implemented method of claim 1, wherein an indication that the container is to be started utilizing the image data is sent from a container runtime to a controller within the container environment.

5. The computer-implemented method of claim 1, wherein the historical data access is retrieved within the container environment, and is used to predict data to be accessed by the container.

6. The computer-implemented method of claim 1, wherein predicting that the container is to be started utilizing the image data within the container environment includes intercepting a pull command to bring the image data from a centralized repository into local memory.

7. The computer-implemented method of claim 1, wherein the data to be accessed by the container is predicted utilizing a manifest that is extended to include information regarding which specific blocks in the image data will be written when a container is started from the image data further comprising predicting a time of an accessing of the data by the container.

8. The computer-implemented method of claim 1, further comprising identifying one or more patterns within the historical data access, and predicting the data to be accessed by the container based on the one or more patterns.

9. The computer-implemented method of claim 1, wherein the data to be accessed includes one or more files.

10. The computer-implemented method of claim 1, wherein the data to be accessed includes one or more specific blocks of one or more files.

11. The computer-implemented method of claim 1, wherein initiating the COW includes sending an instruction to perform the COW for the data to a storage driver within the container environment.

12. The computer-implemented method of claim 1, wherein the COW is performed for the data to be accessed by the container prior to a starting of the container within the container environment.

13. The computer-implemented method of claim 1, wherein the data to be accessed by the container is identified based on a manifest.

14. The computer-implemented method of claim 1, wherein feedback is identified in response to initiating the COW for the data to be accessed by the container.

15. A computer program product for performing proactive copy-on-write for containers, the computer program product comprising a computer readable storage medium having program instructions embodied therewith, wherein the computer readable storage medium is not a transitory signal per se, the program instructions executable by a processor to cause the processor to perform a method comprising:
monitoring and storing within a registry of a container environment, by the processor, historical data access to image data by a container within the container environment;
predicting, by the processor, that a container is to be started utilizing the image data within the container environment;
prior to predicting that the container is to be started utilizing the image data within the container environment, predicting, by the processor, data to be accessed by the container as well as a plurality of predetermined times of an accessing of the image data by the container, based on the historical data access to the image data;
initiating, by the processor, a copy-on-write (COW) for the data to be accessed by the container, in response to predicting that the container is to be started, where the COW is performed for the data to be accessed by the container at the plurality of predetermined times during a runtime of the container; and
disabling, by the processor, the COW for the data to be accessed by the container in response to determining that the data is not used during a runtime of the container within the container environment.

16. The computer program product of claim 15, wherein the historical data access includes data input and output (I/O) to and from the image data.

17. The computer program product of claim 15, wherein the historical data access includes a time during a runtime of the container at which one or more files are accessed in the image data.

18. The computer program product of claim 15, wherein an indication that the container is to be started utilizing the image data is sent from a container runtime to a controller within the container environment.

19. A system, comprising:
a processor; and
logic integrated with the processor, executable by the processor, or integrated with and executable by the processor, the logic being configured to:
monitor and store within a registry of a container environment historical data access to image data by a container within the container environment;
predict that a container is to be started utilizing the image data within the container environment;
prior to predicting that the container is to be started utilizing the image data within the container environment, predict data to be accessed by the container as well as a plurality of predetermined times of an accessing of the image data by the container, based on the historical data access to the image data;
initiate a copy-on-write (COW) for the data to be accessed by the container, in response to predicting that the container is to be started, where the COW is performed for the data to be accessed by the container at the plurality of predetermined times during a runtime of the container; and disable the COW for the data to be accessed by the container in response to determining that the data is not used during a runtime of the container within the container environment.

\* \* \* \* \*